(No Model.) 3 Sheets—Sheet 1.

W. B. MACK.
CAR TRUCK.

No. 340,336. Patented Apr. 20, 1886.

WITNESSES:
H. Brown.
C. J. Loomis.

INVENTOR:
W. B. Mack.
by Wright, Brown & Crossley
Atty's (No Model.) 3 Sheets—Sheet 2.

W. B. MACK.
CAR TRUCK.

No. 340,336. Patented Apr. 20, 1886.

WITNESSES:
H. Brown.
W. Keit Armistead.

INVENTOR:
W. B. Mack,
by Wright, Brown & Crossley
Attys (No Model.)  3 Sheets—Sheet 3.

W. B. MACK.
CAR TRUCK.

No. 340,336.  Patented Apr. 20, 1886.

WITNESSES:
H. Brown
W. Keith Armistead

INVENTOR:
W. B. Mack,
by Wright, Brown & Crossley.
Attys.

UNITED STATES PATENT OFFICE.

WILLIAM B. MACK, OF BOSTON, MASSACHUSETTS.

CAR-TRUCK.

SPECIFICATION forming part of Letters Patent No. 340,336, dated April 20, 1886.

Application filed February 1, 1886. Serial No. 190,459. (No model.)

*To all whom it may concern:*

Be it known that I, WILLIAM B. MACK, of Boston, in the county of Suffolk and State of Massachusetts, have invented certain new and useful Improvements in Railway-Car Trucks, of which the following is a specification.

My invention relates to trucks for railway-cars, and particularly to trucks designed to be employed on elevated roads, constructed as represented in my application for Letters Patent of the United States, filed in the Patent Office December 26, 1885, Serial No. 186,739, in which there are three rails—two arranged, as usual, for the side wheels of the car or truck, and a third arranged in the center of the two side rails and at a lower plane for an additional wheel or wheels.

It is the object of my invention to construct a truck which shall be adapted to railway-tracks of the character mentioned, and which shall render practicable the use of tracks as thus constructed.

My invention consists in a railway-truck provided on opposite sides thereof with wheels arranged somewhat as usual with respect to the platform of the truck, and an additional wheel or wheels arranged at a lower horizontal plane than and centrally between the first-mentioned wheels, said truck being adapted to be swiveled at or near its center to the car by the usual king-bolt connection.

Figure 1:
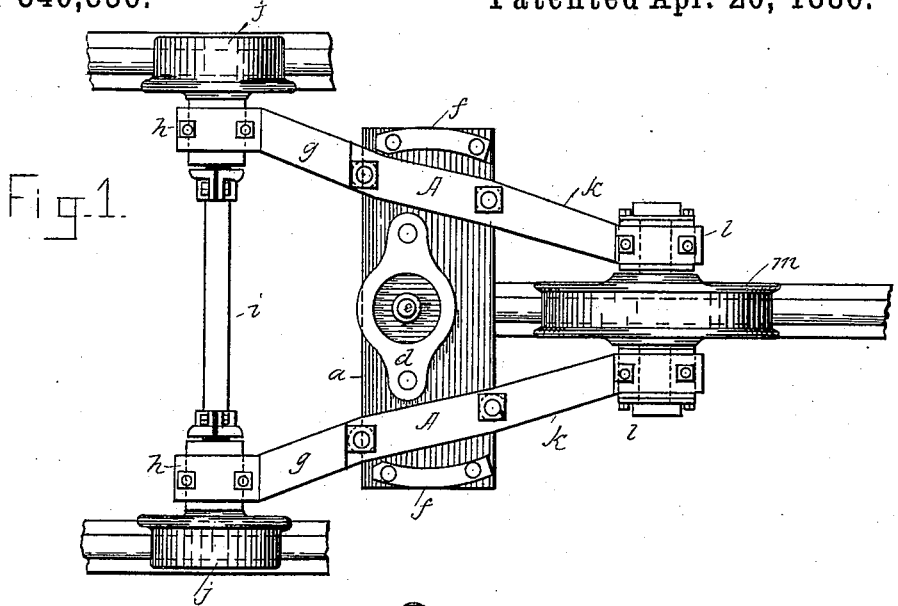
Figure 2:
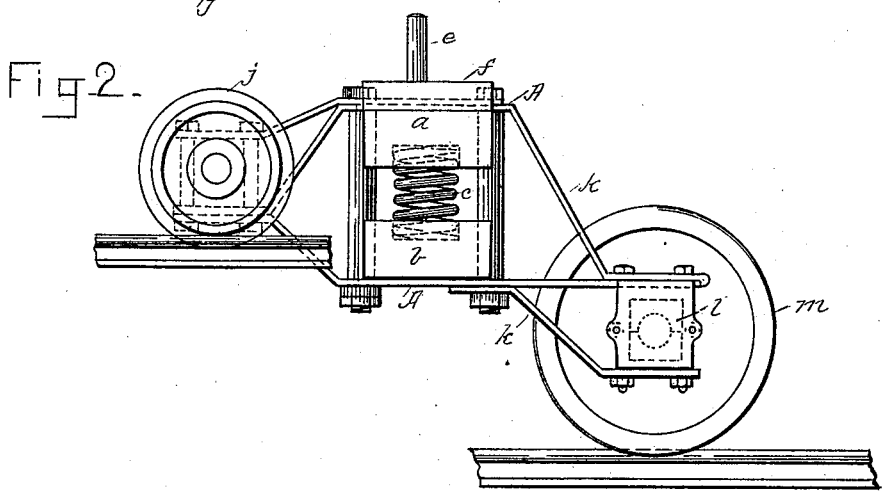
Figure 3:
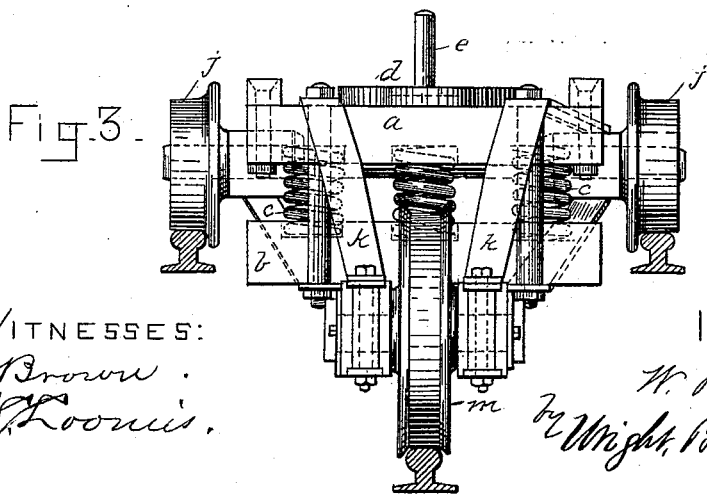
Figure 4:
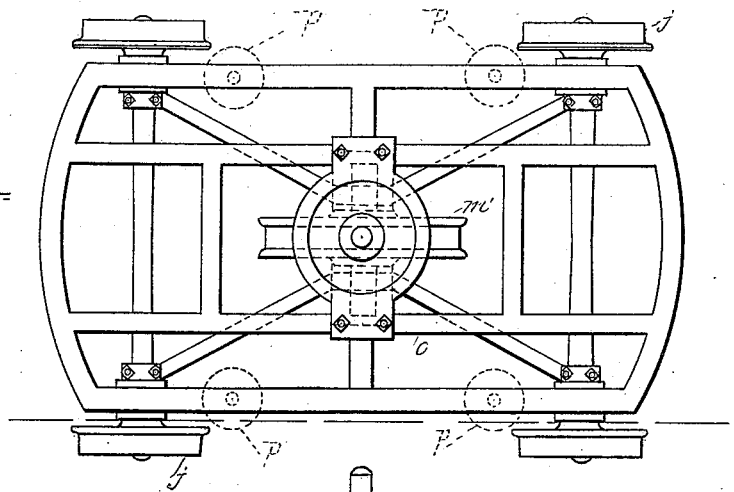
Figure 5:
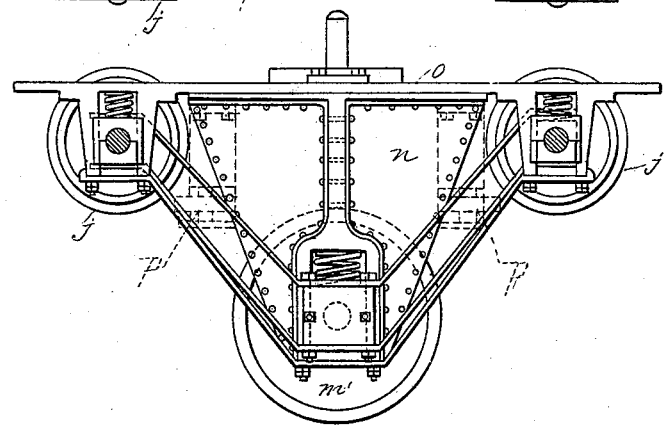
Figure 7:
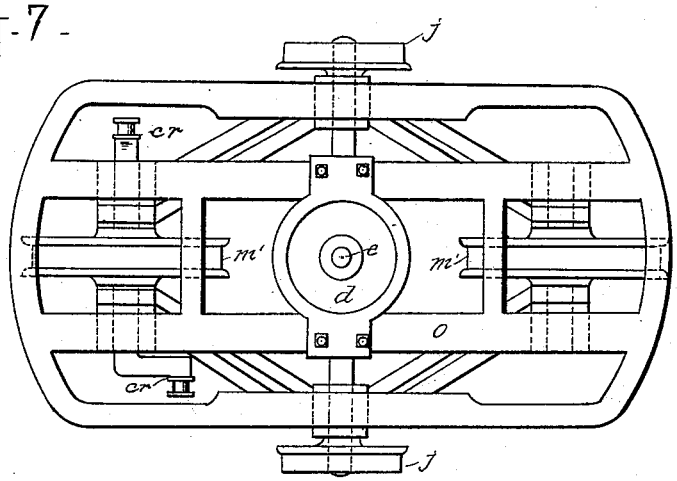
Figure 8:
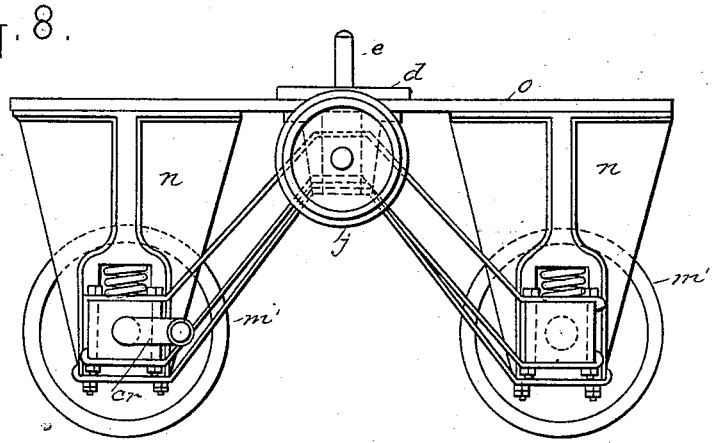

In the drawings hereto annexed and forming a part of this specification, Figure 1 represents a top plan view of my improved railway-truck. Fig. 2 represents a side view thereof. Fig. 3 represents a rear end view. Fig. 4 represents a side elevation of a modification, showing a different arrangement of the side wheels with respect to the center wheel with double the number of the former wheels. Fig. 5 is a plan, and Fig. 6 a rear elevation, of the same. Fig. 7 is a side view, and Fig. 8 is a plan view, of another modification, showing a still different arrangement of the wheels with respect to each other, the number of side and center wheels being equal.

Similar letters refer to similar parts in all of the figures.

In the drawings, $a$, Figs. 1, 2, and 3, represents the upper bolster of the truck, and $b$ the lower bolster, between which are interposed springs $c$ of any suitable character. On upper bolster, $a$, is secured the bearing-plate $d$, through which the king-bolt $e$ projects, all as usual in railway-trucks as commonly constructed. The upper face of said bolster $a$ is also provided with the usual shoes, $f$.

Projecting outwardly and forwardly from the frame A are supports $g$ for the journal-boxes $h$ of the axle $i$, to which the forward wheels, $j$, are secured, as usual. Supports $k$ for the journal-boxes $l$ of rear wheel, $m$, are also secured to the frame A, and project downwardly and rearwardly therefrom, as shown, whereby I am enabled not only to construct said rear wheel, $m$, of much larger size than the forward wheels, $j$, but also to journal it to a much lower horizontal plane, and thus adapt the truck to tracks of the construction shown and described in my said application.

Figure 6:
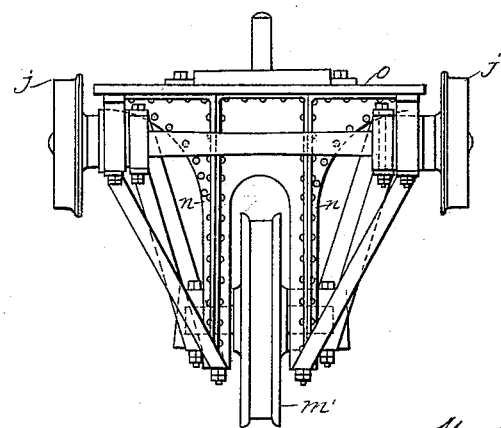

In Figs. 4, 5, and 6 I have shown a modification of my invention in which a four-wheel truck constructed in much the usual manner is provided about its center with an additional wheel, $m'$, of larger diameter journaled in hangers $n$, projecting downwardly from the platform $o$. By this means the additional wheel is adapted to travel on the center lower rail of the track shown and described in my aforesaid application.

Another modification, similar to that just described, is shown in Figs. 7 and 8. In this instance, however, the truck is provided with but two wheels for traversing the upper rails of the track, and with the same number of wheels journaled in hangers projecting below the platform, front and rear, much in the same manner as in the hangers in the center of the platform in Figs. 4, 5, and 6.

In the modifications the axles of the lower and larger wheels may be provided on their ends with cranks $cr$, by which means electrical power may be readily employed to propel the truck and its attached car.

By the construction shown and described I am enabled to render it practicable to utilize a track with the rails arranged as described in my said application, in that in mounting a car on two of my trucks arranged with respect to the car, as are ordinary trucks, the car can be made to run on as short curves as any construction will safely permit.

It is obvious that changes can be made in the form of the platform of the truck or de vices for supporting the journal-boxes of the wheels, or in the arrangement or relationship of the wheels without departing from the spirit of my invention.

In the construction shown in Figs. 4, 5, and 6 I may dispense with the flanges on the upper wheels of the truck, and in lieu thereof employ friction-wheels $p$, adapted to run against the sides of the rails. This construction is found advantageous in rounding short curves and in some other instances, and may obviously be employed on all of the forms of my truck, if the exigencies of the case require it.

What I claim is—

A railway-car-truck provided with wheels on its opposite sides adapted to travel on rails at the same points, and a wheel or wheels of larger size journaled in boxes at the center of the truck, and a lower horizontal plane than the first-mentioned wheels and adapted to travel on a rail arranged between and below said first-mentioned rails, as set forth.

In testimony whereof I have signed my name to this specification, in the presence of two subscribing witnesses, this 23d day of January, 1886.

WILLIAM B. MACK.

Witnesses:
C. F. BROWN,
ARTHUR W. CROSSLEY.